(12) United States Patent
Konstant

(10) Patent No.: US 7,770,903 B2
(45) Date of Patent: Aug. 10, 2010

(54) DRAWER TYPE STORAGE CART

(75) Inventor: Anthony N. Konstant, Winnetka, IL (US)

(73) Assignee: Konstant Products, Inc., Skokie, IL (US)

( * ) Notice: Subject to any disclaimer, the term of this patent is extended or adjusted under 35 U.S.C. 154(b) by 661 days.

(21) Appl. No.: 11/711,143

(22) Filed: Feb. 26, 2007

(65) Prior Publication Data

US 2008/0203706 A1 Aug. 28, 2008

(51) Int. Cl.
*B65G 1/00* (2006.01)
*A47B 53/00* (2006.01)

(52) U.S. Cl. .................. 280/33.997; 211/151; 414/267; 312/201

(58) Field of Classification Search ............. 280/79.11, 280/47.27, 47.34; 211/151; 414/267, 276; 312/201
See application file for complete search history.

(56) References Cited

U.S. PATENT DOCUMENTS

| | | | |
|---|---|---|---|
| 3,923,354 A | 12/1975 | Young | |
| 4,290,166 A | 9/1981 | Melara | |
| 4,462,500 A * | 7/1984 | Konstant et al. | 211/151 |
| 4,467,924 A | 8/1984 | Morcheles | |
| 4,537,577 A | 8/1985 | Sansome | |
| 4,559,027 A | 12/1985 | Sattel | |
| 4,618,191 A | 10/1986 | Peterman | |
| 4,687,404 A * | 8/1987 | Seiz et al. | 414/276 |
| 4,702,174 A * | 10/1987 | Tredwell et al. | 104/172.2 |
| 4,715,765 A * | 12/1987 | Agnoff | 414/276 |
| 4,773,546 A * | 9/1988 | Konstant | 211/151 |
| 4,915,240 A * | 4/1990 | Konstant | 211/151 |
| 4,944,231 A | 7/1990 | Leist | |
| 4,982,851 A * | 1/1991 | Konstant | 211/151 |
| 4,988,251 A * | 1/1991 | Kinney | 414/276 |
| 5,024,164 A | 6/1991 | Leist | |
| 5,080,241 A * | 1/1992 | Konstant | 211/151 |
| 5,137,159 A | 8/1992 | Collins | |
| 5,170,896 A * | 12/1992 | Konstant | 211/151 |
| 5,205,627 A | 4/1993 | Davison | |
| 5,299,816 A | 4/1994 | Vom Braucke | |
| 5,316,157 A * | 5/1994 | Konstant | 211/151 |
| 5,415,300 A * | 5/1995 | Krummell et al. | 211/151 |
| 5,476,180 A * | 12/1995 | Konstant | 211/151 |
| 5,482,422 A * | 1/1996 | Hammond | 414/276 |
| 5,567,103 A * | 10/1996 | Konstant | 414/276 |
| 5,597,217 A | 1/1997 | Hoska | |
| 5,617,961 A * | 4/1997 | Konstant et al. | 211/151 |
| 5,642,976 A * | 7/1997 | Konstant | 414/276 |
| 5,816,604 A | 10/1998 | Hsieh | |
| 5,967,346 A | 10/1999 | Price, Jr. | |

(Continued)

OTHER PUBLICATIONS

Brochure: Symotech AB, Symotech Pallet Drawer (English), at least as early as 2005.

(Continued)

*Primary Examiner*—Glenn Dayoan
*Assistant Examiner*—Jacob Meyer
(74) *Attorney, Agent, or Firm*—Niro, Haller & Niro

(57) ABSTRACT

The present inventions provide self-supporting drawer type storage carts for the storage of pallets or other loads, including heavy and relatively fragile loads, that may be smoothly moved between an open or forward position and a closed or rearward position.

8 Claims, 6 Drawing Sheets

U.S. PATENT DOCUMENTS

| | | |
|---|---|---|
| 6,024,376 A | 2/2000 | Golichowski |
| 6,039,422 A | 3/2000 | Butters |
| 6,161,485 A | 12/2000 | Muth |
| 6,186,725 B1 * | 2/2001 | Konstant ............... 414/276 |
| 6,231,138 B1 | 5/2001 | Janson |
| 6,363,860 B1 | 4/2002 | Andre |
| 6,468,015 B1 * | 10/2002 | Konstant ............... 414/276 |
| 6,471,309 B1 | 10/2002 | Turner |
| 6,474,484 B1 * | 11/2002 | Miller, Jr. ............... 211/162 |
| 6,526,702 B2 | 3/2003 | Jones |
| 6,669,314 B1 | 12/2003 | Nemec |
| 6,688,708 B1 | 2/2004 | Janson |
| 6,843,180 B1 | 1/2005 | Keaton |
| 7,140,503 B2 * | 11/2006 | Krummell et al. ........ 211/151 |
| 7,201,243 B2 * | 4/2007 | Konstant ............... 180/20 |
| 7,516,855 B2 * | 4/2009 | Konstant ............... 211/162 |
| 2002/0159865 A1 * | 10/2002 | Konstant ............... 414/267 |
| 2005/0082246 A1 | 4/2005 | Krummell |
| 2005/0279608 A1 | 12/2005 | Konstant |
| 2006/0012140 A1 * | 1/2006 | Konsant ............... 280/79.11 |
| 2006/0045672 A1 * | 3/2006 | Maynard et al. ........ 414/276 |
| 2006/0102574 A1 | 5/2006 | Konstant |
| 2007/0056831 A1 * | 3/2007 | Sullivan ............... 198/774.1 |
| 2007/0295682 A1 * | 12/2007 | Konstant ............... 211/151 |
| 2008/0203706 A1 * | 8/2008 | Konstant ............... 280/659 |

OTHER PUBLICATIONS

Brochure: Symotech AB, Symotech Pallet Drawer (Swedish), at least as early as 2005.
Brochure: Rack Engineering Division, Storage Products, at least as early as 2005.
Brochure: Proper Storage Systems, Shelf and Unit Construction, at least as early as 2005.
Web page: Frazier, Glide 'N Pick (2004).
Brochure: E-Z Glide, at least as early as 2005.

* cited by examiner

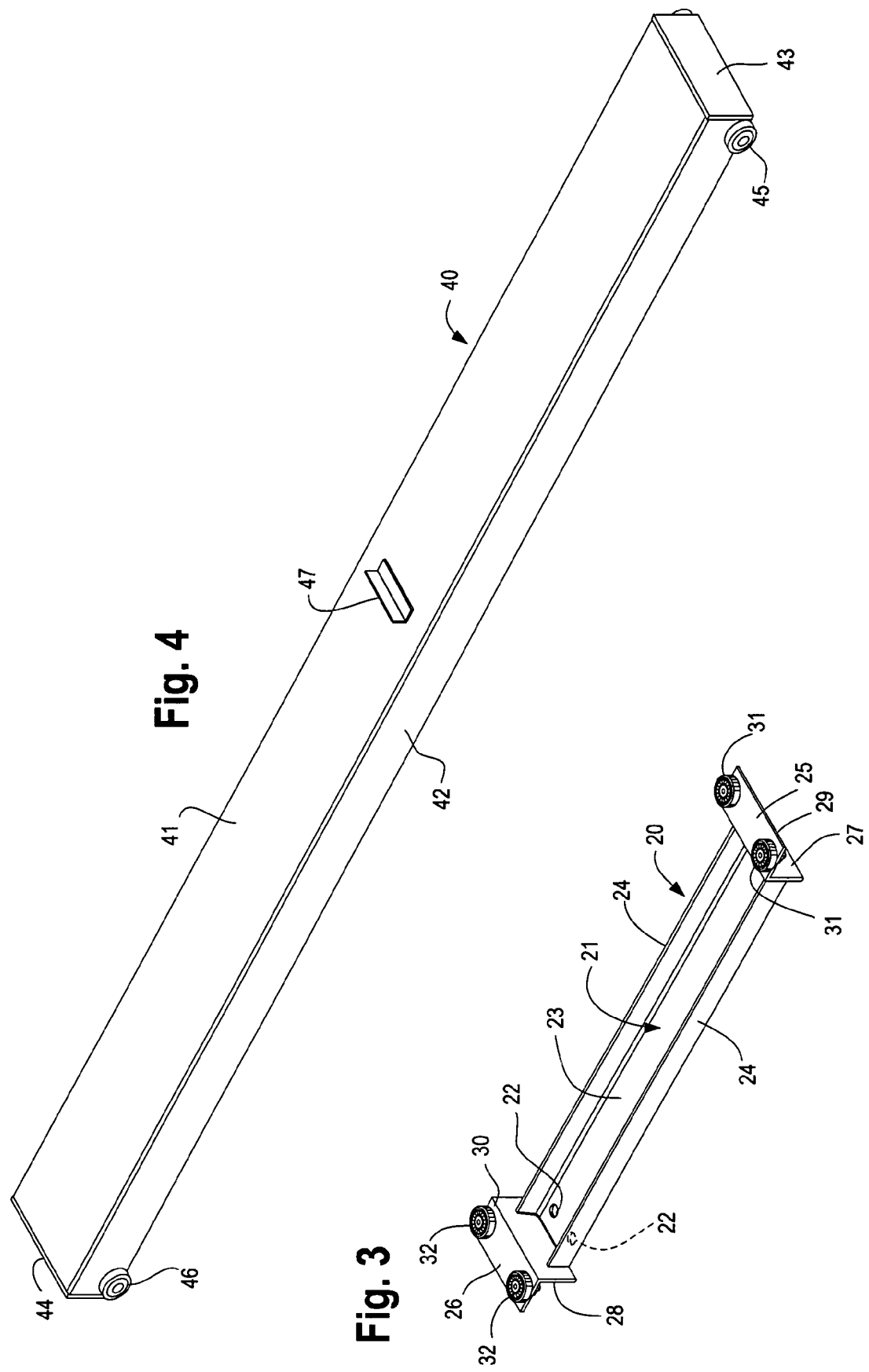

DRAWER TYPE STORAGE CART

BACKGROUND OF THE INVENTION

The present inventions relate to storage carts. More particularly, the present inventions relate to drawer type storage carts that support loads and which are moveable between an open and closed position for easy access to and storage of loads. The storage cart systems of the present invention are capable of smooth movement between positions and are particularly useful in storing relatively fragile items such as glass, stone and countertops.

There are a number of storage carts available to store a variety of loads. One example may be found in Applicant's Publication No. US 2006/0012140 A1, which is incorporated herein by reference. That publication teaches storage carts that are particularly useful in consumer warehouse stores, although they have many other uses. In general, Applicant's publication is directed to a cart and a guide, the cart capable of supporting heavy loads while efficiently moveable between an open and closed position, and guided against undesired lateral movement.

There are some storage applications that require even smoother front to back movement of the storage cart and its load than that taught in Applicant's publication. For example, panes of glass for table tops and the like are heavy, but relatively fragile. Thus, there is a need for cart type storage devices that accommodate such loads, yet are capable of smooth movement between open and closed positions.

SUMMARY OF INVENTION

The present inventions overcome the problems associated with the storage of and access to heavy, yet relatively fragile, loads. For example, the present inventions provide a drawer type storage cart for supporting a load on a generally flat surface. A cart assembly having wheels to permit movement of the cart on the generally flat surface, a slide return bracket and guide brackets including horizontal slide rollers are provided. The present inventions also include a slide assembly cooperating with the cart assembly having wheels to permit movement of the slide assembly on the generally flat surface and a slide advance bracket, as well as a guide assembly secured to the generally flat surface including at least one pair of guide rollers which cooperate with the slide assembly. The cart assembly of the present inventions may also include at least one pair of front slide rollers and at least one pair of rear slide rollers, the slide rollers cooperating with the slide assembly, and a guide assembly having at least one pair of front slide rollers and at least one pair of rear slide rollers, the pairs of slide rollers cooperating with the slide assembly. The present inventions may further provide that the slide advance bracket cooperates with the cart assembly during movement of the cart in a forward direction and the slide return bracket cooperates with the slide assembly during movement of the cart assembly in a rearward direction.

The present inventions further provide for a drawer type storage cart for supporting a load on a generally flat surface which is capable of movement between a front or open position and a rear or closed position, including a cart assembly for supporting a load having at least two pairs of wheels to roll on the generally flat surface and a slide return member. A slide assembly having at least one pair of front wheels and at least one pair of rear wheels for movement on the generally flat surface and a slide advance bracket is also provided. A guide assembly secured to the generally flat surface including at least one pair of front guide rollers and at least one pair of rear guide rollers that cooperate with the slide assembly is further provided. The cart assembly of the present inventions may include at least two guide brackets including a pair of opposed slide rollers for rolling engagement with the slide member. The present inventions may further provide for a slide advance bracket that cooperates with the cart assembly during movement of the cart to an open position and a slide return bracket to cooperate with the slide assembly during movement of the cart assembly to a closed position.

Accordingly, an object of the present invention is to provide drawer type storage carts that may be smoothly moved between an open and a closed position.

Another object of the present invention is to provide moveable storage carts that prevent undesired lateral movement.

An additional object of the present invention is to provide drawer type storage carts that are self-supporting.

A further object of the present invention is to provide a drawer type storage carts for use in a warehouse for storing heavy, yet relatively fragile, items that may be selectively moved between an open or forward position and a closed or rearward position.

Yet a further object of the present invention is to provide drawer type storage carts that may be incorporated into new or existing rack type storage systems.

Yet an additional object of the present invention is to provide a drawer type storage system that may be constructed from a wide variety of materials, including structural tubing, angles, beams and channels.

Inventor's Definition of the Terms

The terms used in the claims of this patent are intended to have their broadest meaning consistent with the requirements of law. Where alternative meanings are possible, the broadest meaning is intended. All words used in the claims are intended to be used in the normal, customary usage of grammar and the English language.

BRIEF DESCRIPTION OF THE DRAWINGS

The stated and unstated features and advantages of the present inventions will become apparent from the following descriptions and drawings wherein like reference numerals represent like elements in the various views, and in which:

FIG. 3 is a perspective view of a preferred embodiment of a guide assembly of the present invention;

FIG. 4 is a perspective view of a preferred embodiment of a slide assembly of the present invention;

DETAILED DESCRIPTION OF THE PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
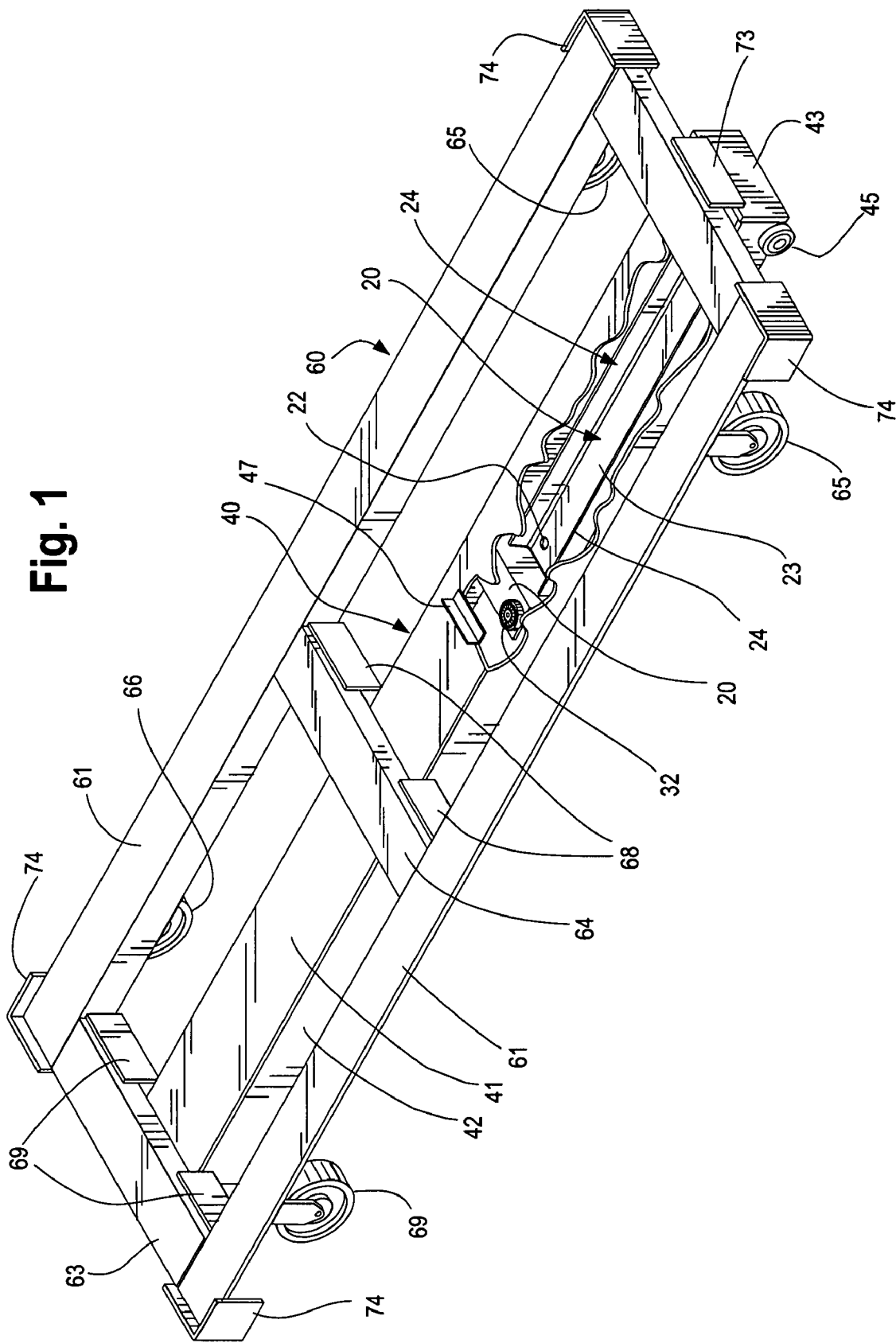
FIG. 1 is a perspective view of a preferred embodiment of a drawer type storage system of the present invention shown in a storage or closed position with portions of the guide assembly removed to show other components.

A preferred embodiment of a drawer type cart storage system of the present invention is shown generally as 10 in FIG. 1. It is designed to roll on a generally flat surface or floor (not shown) of a warehouse, which is typically a concrete slab. The drawer type storage system 10 is designed and sized to support the intended load. For example, it may be sized to accommodate a standard pallet and its load and to fit within the bays created by typical shelf or rack type storage systems and below the shelves used for the storage of inventory items. Alternatively, storage cart 10 may be longer and thinner, as shown in the drawings, to accommodate glass or stone countertops and the like. Drawer type storage system 10 may be substantially completely under a shelf and/or substantially out of an access aisle when in a fully retracted or closed position toward the rear of a storage bay, and may extend substantially into the aisle or out of the bay when in its fully extended or open position. It will be understood by those of skill in the art that the present inventions are equally applicable to other storage settings, and may be used in situations without storage bays.

It will also be understood by those of skill in the art that the components of drawer type storage system 10 of the present invention and its related assemblies may be constructed from a wide variety of materials (e.g., wood, iron, steel or aluminum) having a variety of cross-sectional shapes (such as channels, angles, tubing, I-beams and S-beams). However, these particular standard structural components are not required to practice the inventions, as other structural members of different cross sections may also be advantageously fabricated and employed to practice the claimed inventions.

Figure 2:
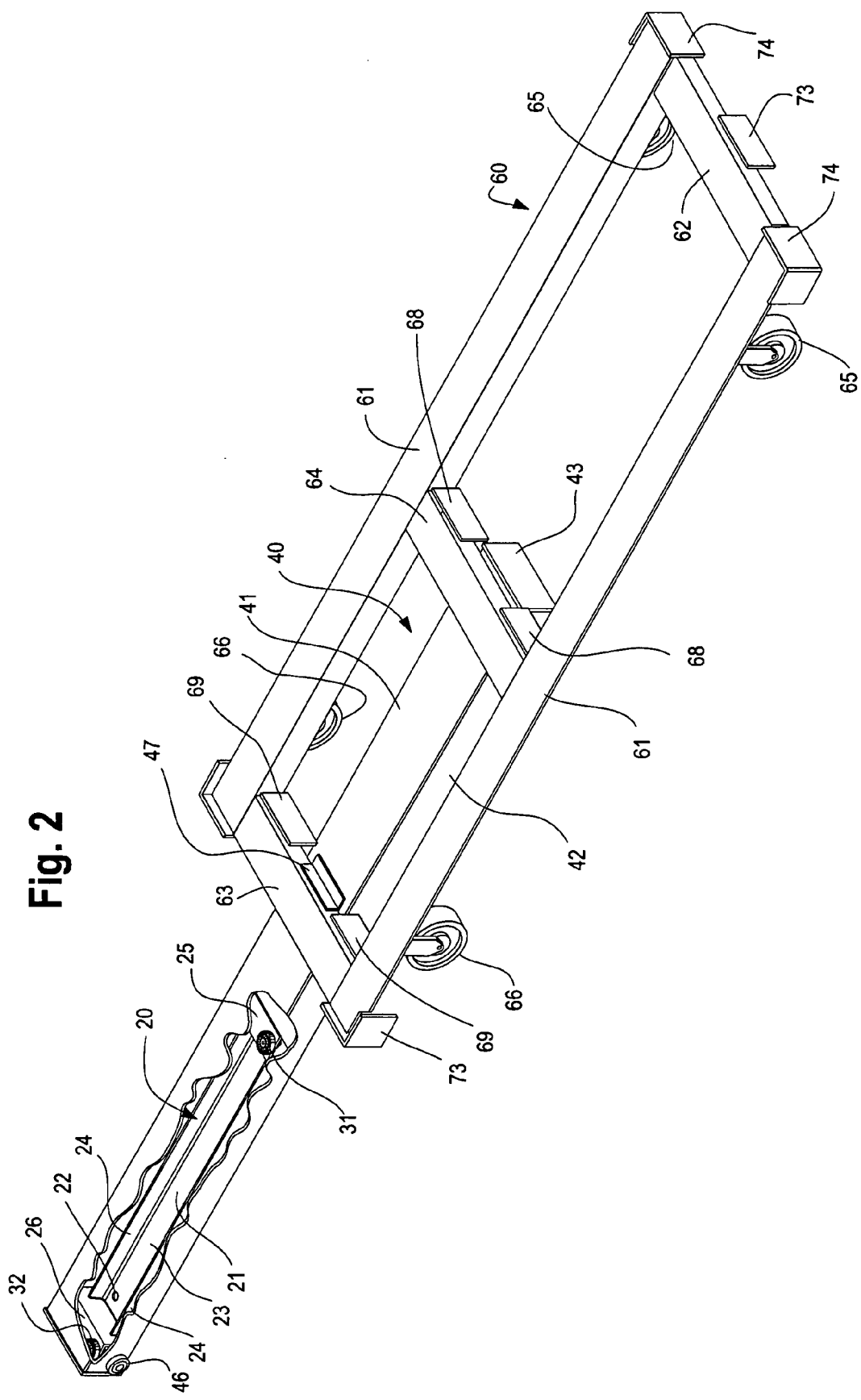
FIG. 2 is a perspective view of the embodiment of FIG. 1 shown in the forward or open position.
Figure 5:
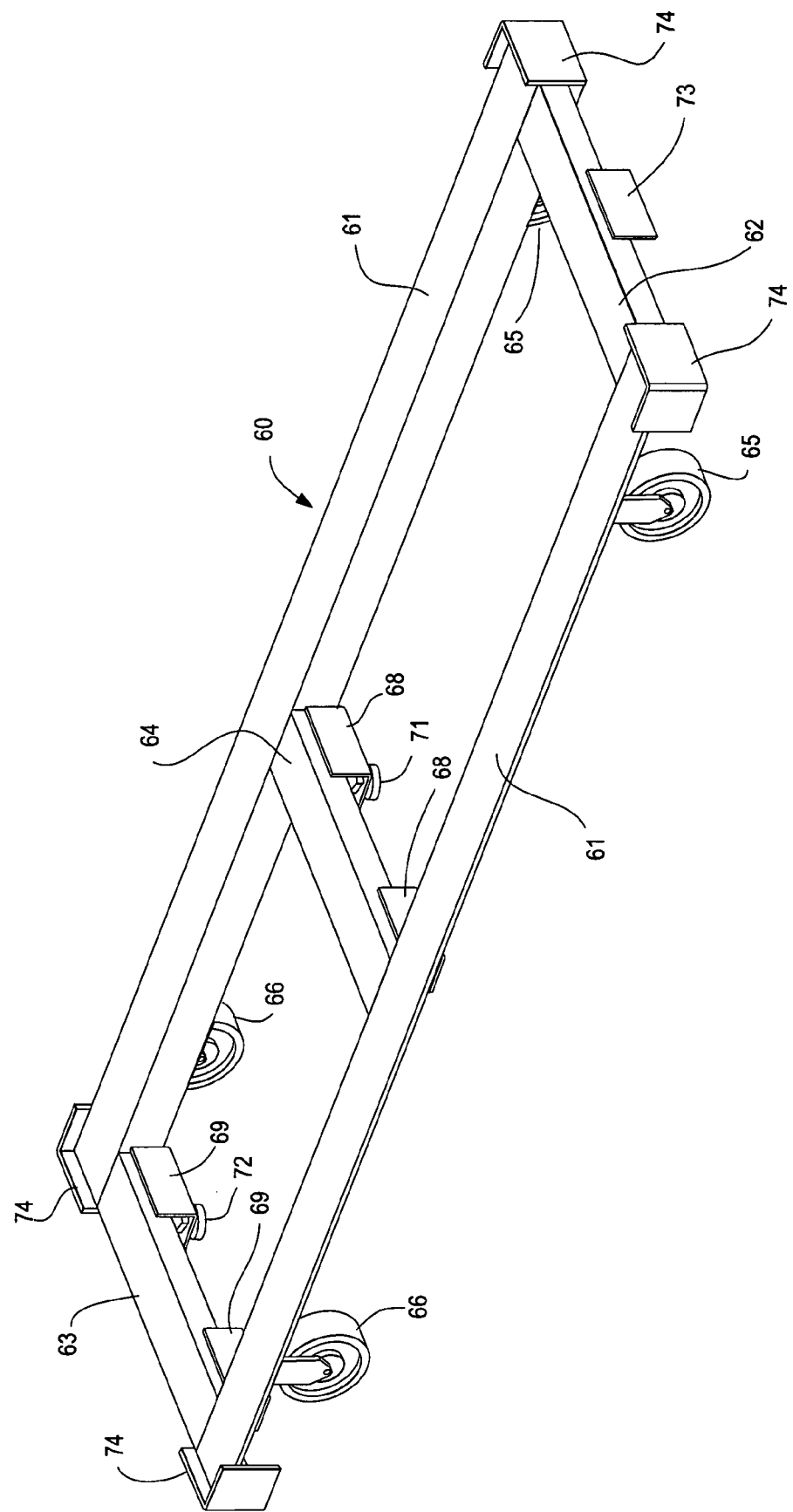
FIG. 5 is a perspective view of a preferred embodiment of a cart assembly of the present invention.
Figure 6:
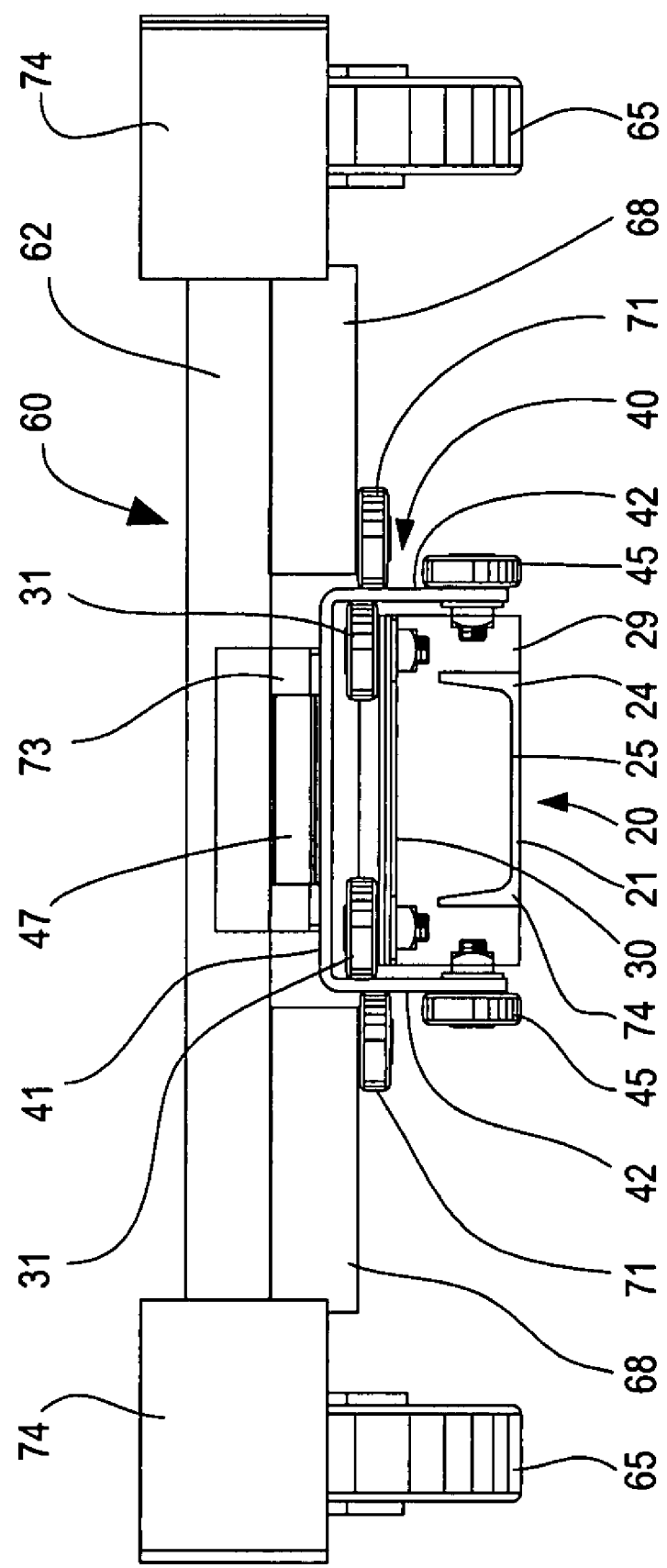
FIG. 6 is a front view of a preferred embodiment of the present invention showing the interaction of the guide, slide and cart assemblies of the present invention.
Figure 7:
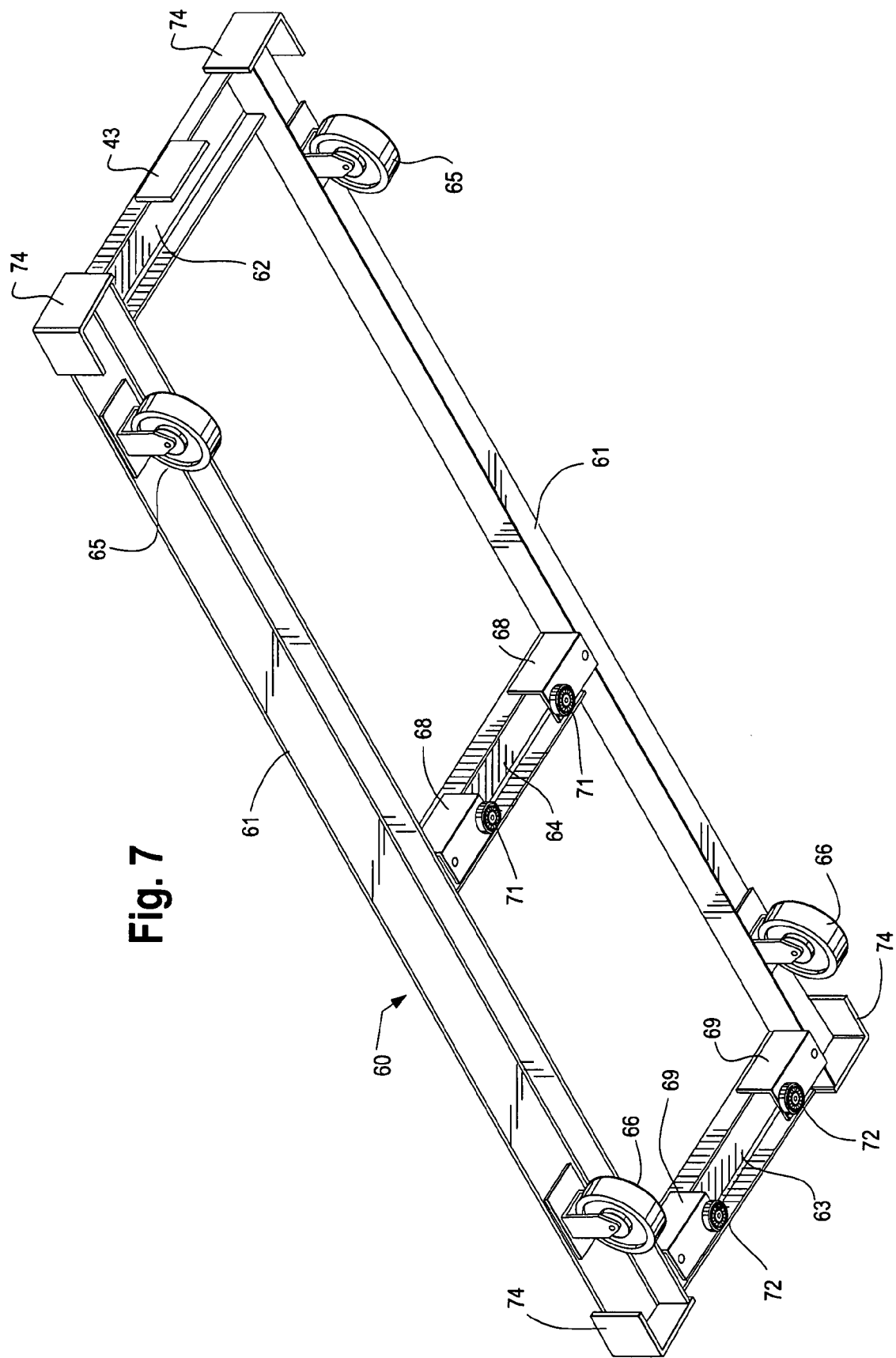
FIG. 7 is a bottom perspective view of the cart assembly of FIG. 5.

The storage cart system 10 of the present invention generally includes three principal component assemblies. As shown in FIGS. 1 and 2, system 10 includes a guide assembly 20, a slide assembly 40 and a cart assembly 60. The three principal assemblies cooperate with one another during movement of cart system 10 and are aligned as shown in FIG. 6. FIG. 1 shows the relationship of the principal assemblies when cart assembly 60 is in the fully retracted or rearward position. FIG. 2 shows the relationship of the assemblies when cart assembly 60 is in the fully extended or forward position.

A preferred embodiment of guide assembly 20 may best be seen by reference to FIGS. 1, 2 and 3. Guide assembly 20 includes a base 21 which may be attached to the warehouse floor slab or other support surface (not shown) through holes 22 or other well known means. In a preferred embodiment, base 21 is made from a standard channel having a web 23 and two upstanding flanges 24. Base 21 also includes a front roller bracket 25 and a rear roller bracket 26. As shown in the Figures, roller brackets 25 and 26 are made from structural angles having vertical flanges 27 and 28 and horizontal flanges 29 and 30. Guide assembly 20 also includes a pair of front guide rollers 31 and rear guide rollers 32. Front guide rollers 31 are rotatably mounted in the horizontal plane to horizontal flange 29 of front bracket 25. Similarly, rear guide rollers 32 are rotatably mounted to operate on the horizontal plane to horizontal flange 30 of rear roller bracket 26. It will be understood by those of ordinary skill in the art that guide rollers 31 and 32 may be mounted by a variety of well known means. And, bearings (not shown) may be used instead of guide wheels 31 and 32. Guide wheels 31 and 32 are spaced to cooperate with slide assembly 40 as hereinafter described.

The construction of a preferred embodiment of slide assembly 40 may best be seen by reference to FIGS. 1, 2 and 4. Slide assembly 40 is generally rectangular and box shaped, and includes a top web 41, two side flanges 42, a front plate 43 and a rear plate 44. Pairs of front slide wheels 45 and rear side wheels 46 are also provided which are designed to roll on the ground or warehouse floor (not shown). It will be understood by those of ordinary skill in the art that said wheels 45 and 46 may be rotatably mounted in a variety of ways. A slide advance bracket 47 is affixed to the top of web 41 to function as hereinafter described. Also as hereinafter described, the side flanges 42 of slide assembly 40 are spaced apart to rollably engage front and rear guide rollers 31 and 32 of guide assembly 20.

The third principal assembly is cart assembly 60, which may best be seen by reference to FIGS. 1, 2, 5 and 7. In a preferred embodiment, cart assembly 60 includes two side members 61, a front cross member 62, a rear cross member 63 and a middle cross member 64. In a preferred embodiment, side members 61 and cross members 62, 63 and 64 are made from structural angles, but a wide variety of structural or formed members may be used. These members may be welded together or secured by a variety of well known means. A pair of front wheels 65 and a pair of rear wheels 66 are provided which are to roll on the ground or warehouse floor (not shown). Cart assembly 60 is sized and designed to carry and support the intended load.

Cart assembly 60 also includes guide brackets 68 mounted to opposing sides of center cross member 64 and guide brackets 69 mounted to opposing sides of rear cross member 63. The guide brackets 68 and 69 are spaced apart a sufficient distance so that they provide clearance for slide assembly 40 as hereinafter described. Rotatably mounted to each pair of guide brackets 68 and 69 are slide rollers 71 and 72 respectively, each of which is oriented on a horizontal plane to function as hereinafter described. A slide return bracket 73 is mounted on front cross member 62 to function as hereinafter described. Load restraints 74 may be mounted at each corner of cart assembly 60 to help return a pallet and/or load during movement between the closed and open positions.

The orientation and relationship between the three principal assemblies may best be seen by reference to FIG. 6. As shown therein, slide assembly 40 is sized to fit over guide assembly 20. In a preferred embodiment, the inside of side flanges 42 are in rolling contact with front and rear guide wheels 31 and 32 of guide assembly 20. Front and rear slide wheels 45 and 46 roll on the ground or warehouse floor. Horizontal slide rollers 71 and 72 of cart assembly 60 rollingly engage the outside of side flanges 42 of slide assembly 40. Finally, wheels 65 and 66 of cart assembly 60 support the load (not shown) and roll along the ground or warehouse floor.

FIG. 1 shows the present invention in a closed or rearward position. In operation, a load (not shown) is placed on cart assembly 60. When it is desired to move cart assembly 60 forward, a worker may grab the load or use an optional handle (not shown) attached to cart assembly 60. As cart 60 is moved forward, slide advance bracket 47 is engaged by middle cross member 64 of cart assembly 60. This causes slide assembly 40 to move forward along with cart assembly 60 until cart assembly 60 reaches its most forward or open position, as shown in FIG. 2. Forward progress of cart assembly 60 is stopped when rear plate 44 of slide assembly 40 contacts rear roller bracket 26 of guide assembly 20.

When it is desired to close drawer system 10, the load or optional handle of cart 60 may be pushed rearward. Slide return bracket 73 eventually contacts front plate 43 of slide assembly 40. As a result, slide assembly 40 is then retracted to the position shown in FIG. 1. Because of the interaction between the guide assembly 20, the slide assembly 40 and cart assembly 60, smooth movement of cart assembly 60 is enabled. This is particularly beneficial when heavy yet relatively fragile loads are to be stored.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention.

Various features of the present inventions are set forth in the following claims.

What is claimed is:

1. A drawer type storage cart for supporting a load on a generally flat surface and capable of movement between an open and closed position, comprising:
   a cart assembly having wheels to permit movement of said cart assembly on said generally flat surface, a slide return bracket and guide brackets including horizontal slide rollers;
   a slide assembly cooperating with said cart assembly having wheels to permit movement of said slide assembly on said generally flat surface, a front plate and a slide advance bracket;
   a guide assembly secured to said generally flat surface and including at least one pair of guide rollers which cooperate with said slide assembly;
   wherein said slide return bracket engages said front plate when said cart assembly is moved from an open to a closed position.

2. A drawer type storage cart for supporting a load on a generally flat surface, comprising:
   a cart assembly having wheels to permit movement of said cart assembly on said generally flat surface, a slide return bracket and guide brackets including horizontal slide rollers;
   a slide assembly cooperating with said cart assembly having wheels to permit movement of said slide assembly on said generally flat surface and a slide advance bracket;
   a guide assembly secured to said generally flat surface and including at least one pair of guide rollers which cooperate with said slide assembly;
   wherein said cart assembly further includes at least one pair of front slide rollers and at least one pair of rear slide rollers, said slide rollers cooperating with said slide assembly.

3. A drawer type storage cart for supporting a load on a generally flat surface, comprising:
   a cart assembly having wheels to permit movement of said cart assembly on said generally flat surface, a slide return bracket and guide brackets including horizontal slide rollers;
   a slide assembly cooperating with said cart assembly having wheels to permit movement of said slide assembly on said generally flat surface and a slide advance bracket;
   a guide assembly secured to said generally flat surface and including at least one pair of guide rollers which cooperate with said slide assembly, and at least one pair of front slide rollers and at least on pair of rear slide rollers, said slide rollers cooperating with said slide assembly.

4. The invention of claim 1 wherein said slide advance bracket engages said cart assembly during movement of said cart in an open position.

5. A drawer type storage cart for supporting a load on a generally flat surface and capable of movement between a front or open position and a rear or closed position, comprising:
   a cart assembly for supporting a load having at least two pairs of wheels to roll on said generally flat surface and a slide return member;
   a slide assembly having at least one pair of front wheels and at least one pair of rear wheels for movement on said generally flat surface and a slide advance bracket;
   a guide assembly secured to said generally flat surface including at least one pair of front guide rollers and at least one pair of rear guide rollers that cooperate with said slide assembly
   wherein said slide advance bracket engages said cart assembly during movement of said cart in a front or open position.

6. A drawer type storage cart for supporting a load on a generally flat surface and capable of movement between a front or open position and a rear or closed position, comprising:
   a cart assembly for supporting a load having at least two pairs of wheels to roll on said generally flat surface and a slide return member;
   a slide assembly having at least one pair of front wheels and at least one pair of rear wheels for movement on said generally flat surface and a slide advance bracket;
   a guide assembly secured to said generally flat surface at least one pair of front guide rollers and at least one pair of rear guide rollers that cooperate with said slide assembly;
   wherein said cart assembly further includes at least two guide brackets including a pair of opposed slide rollers for rollingly engaging with said slide member.

7. The invention of claim 6 wherein said cart assembly includes a handle.

8. The invention of claim 6 wherein said slide advance bracket cooperates with said cart assembly during movement of said cart to an open position and said slide return bracket cooperates with said slide assembly during movement of said cart assembly to a closed position.

* * * * *